United States Patent
Rosenfellner et al.

(10) Patent No.: US 6,214,082 B1
(45) Date of Patent: Apr. 10, 2001

(54) PROCESS FOR THE REDUCTION OF METAL-OXIDE-BEARING MATERIAL

(75) Inventors: Gerald Rosenfellner, St. Peter/Au; Joerg Diehl, Linz, both of (AT)

(73) Assignee: Voest-Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/205,153

(22) Filed: Dec. 4, 1998

(30) Foreign Application Priority Data

Dec. 5, 1997 (AT) .................................................. 2075/97

(51) Int. Cl.$^7$ .................................................. C21B 13/02
(52) U.S. Cl. .................. 75/414; 75/490; 75/505; 266/156
(58) Field of Search ..................... 266/199, 176, 266/156; 75/490, 414, 505

(56) References Cited

U.S. PATENT DOCUMENTS

| | | | |
|---|---|---|---|
| 2,862,808 | * 12/1958 | De Jahn | 75/490 |
| 3,850,616 | 11/1974 | Cruse, Jr. | 75/34 |
| 4,212,452 | 7/1980 | Hsieh | 266/156 |
| 4,248,626 | 2/1981 | Scarlett et al. | 75/38 |
| 4,270,740 | 6/1981 | Sanzenbacher et al. | 266/157 |
| 4,606,761 | 8/1986 | de Waal et al. | 75/10.19 |
| 4,735,653 | 4/1988 | Mathews | 75/35 |
| 5,069,716 | 12/1991 | Dam et al. | 75/495 |

FOREIGN PATENT DOCUMENTS

| | | |
|---|---|---|
| 387403 | 1/1989 | (AT) . |
| 389124 | 10/1989 | (AT) . |
| 3432090 | 3/1986 | (DE) . |
| 4041689 | 10/1991 | (DE) . |
| 19525270 | 1/1996 | (DE) . |
| 0157917 | 10/1985 | (EP) . |

* cited by examiner

*Primary Examiner*—Melvyn Andrews
(74) *Attorney, Agent, or Firm*—Ostrolenk, Faber, Gerb & Soffen, LLP

(57) ABSTRACT

The invention relates to a process for the reduction of metal-oxide-bearing material, particularly of iron ore, in a reduction vessel (1), wherein the metal-oxide-bearing material is charged from a vessel (2) for the metal-oxide-bearing material into the reduction vessel (1) and reduced therein by means of a reduction gas flowing counter currently to the metal-oxide-bearing material and wherein waste reduction gas discharged from the reduction vessel (1) is used for preheating the metal-oxide-bearing material in the vessel (2) for metal-oxide-bearing material, which is characterized in that the waste reduction gas discharged from the reduction vessel (1) is combusted and that a gas seal (16) is operated with the combusted waste reduction gas, which is located between the reduction vessel (1) and the vessel (2) for metal-oxide-bearing material, whereby the reduction vessel (1) is sealed against the vessel (2) for metal-oxide-bearing material (FIG. 1).

9 Claims, 3 Drawing Sheets

PROCESS FOR THE REDUCTION OF METAL-OXIDE-BEARING MATERIAL

Figure 1:
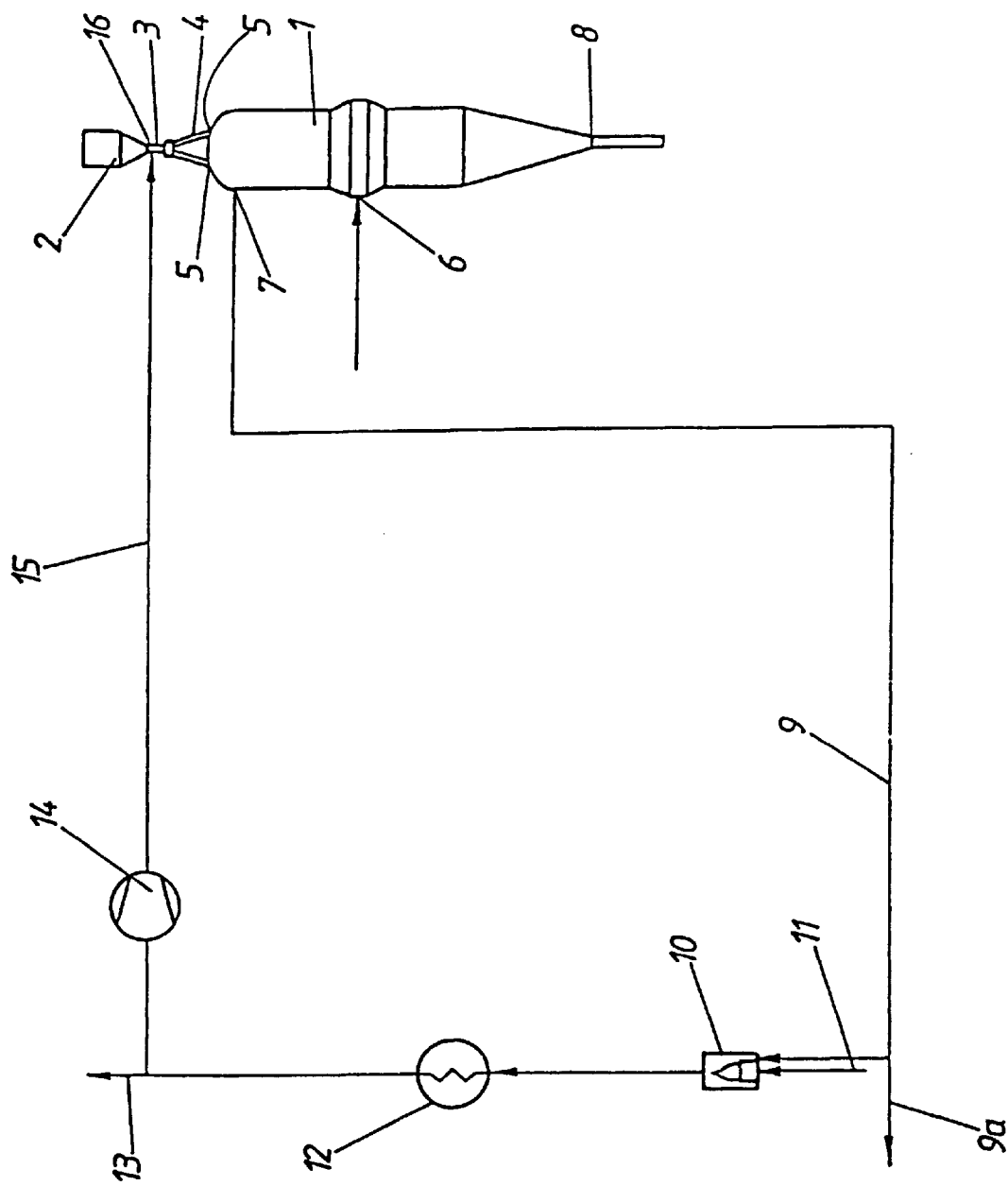

The invention relates to a process for the reduction of metal-oxide-bearing material, particularly of iron ore, in a reduction vessel, wherein the metal-oxide-bearing material is charged from a vessel for the metal-oxide-bearing material into the reduction vessel and reduced in the latter by means of a reduction gas flowing countercurrently to the metal-oxide-bearing material and wherein waste reduction gas discharged from the reduction vessel serves to preheat the metal-oxide-bearing material in the vessel for the metal-oxide-bearing material, as well as to a plant for implementing the process.

A process of this type is known, for example, from AT-B-387 403. According to this known process, iron-ore-bearing input materials are preheated and calcined in a preheating shaft separated from the direct reduction zone by means of a top gas discharged from the direct reduction zone and post-combusted in a separate combustion chamber. The hot gas formed by post-combustion has a total CO and $H_2$ content of at least 10 volume percent. This has the disadvantage that a gas containing CO and $H_2$ can escape through the preheating shaft.

Processes according to which a preheating zone is directly integrated in the reduction shaft are known from DE-C-40 41 689 and AT-B-389 124. These known processes have the disadvantage that the capacity of the reduction shaft can only be partially utilized for the direct reduction of the iron-oxide-bearing material because part of the reduction shaft is required for preheating the iron-oxide-bearing material.

A process for preheating iron-oxide-bearing material in a separate preheating chamber is known, for example, from DE-A-195 25 270. In this process, nitrogen is used for preheating, which has the disadvantage of high nitrogen consumption, and the large nitrogen quantities are moreover to be specially heated.

A separate preheating chamber for preheating iron-ore-bearing material is also known from EP-A-0 157 917. This document does not give any statements on the type of preheating.

According to DE-A-34 32 090, sulfur-bearing ore is reduced in a shaft furnace in counterflow with reduction gas. The off-gas exiting the furnace is divided into two flows, the first flow being used for preheating and desulfurization of the ore which is contained in an ore bin above the shaft furnace and the second flow being conveyed to a catalytic gas converter together with hydrocarbons for the purpose of generating reduction gas.

A container from which ore is charged into the ore bin is located above the ore bin of the arrangement described in DE-A-34 32 090. Inert gas is injected into the connection between this container and the ore bin in order to prevent sulfur-bearing off-gas from exiting the ore bin through this connection. This measure thus serves to establish a gas seal. U.S. Pat. No. 4 212 452 describes a plant in which iron oxide is reduced to sponge iron in a shaft furnace through the addition of solid carbon-bearing material which is gasified in an upper zone of the shaft furnace and also through the addition of a reduction gas containing CO and $H_2$ in a central part of the shaft furnace. The iron oxide is charged together with the solid carbon-bearing material from the top into the shaft furnace and flows through the shaft furnace from the top to the bottom, partly cocurrently and partly countercurrently to the reduction gases. In a lower zone of the shaft furnace, the sponge iron formed by reduction is cooled by means of cool, dry reduction gas. The shaft furnace is sealed towards the top and bottom by means of one $CO_2$-operated gas seal each in order to prevent the undesirable escape of reduction gas from the shaft furnace, $CO_2$ being recovered therein from waste reduction gas through gas scrubbing. Generation of sealing gas is thus relatively expensive in the known process.

An arrangement which is used, for example, for the direct reduction of iron-oxide-bearing material by means of reduction gas in a shaft furnace is known from U.S. Pat. No. 3 850 616. The iron-oxide-bearing material flows through the shaft furnace from the top to the bottom in counterflow to the reduction gas and is cooled with cool reduction gas in the lower zone of the shaft furnace.

In order to prevent reduction gas from exiting the shaft furnace, a gas seal operated with inert gas is provided at the lower end of the shaft furnace. This known arrangement has the disadvantage of high consumption of expensive inert gas.

Processes in which iron-oxide-bearing material is reduced in a shaft furnace by means of reduction gas and melted in a melting unit structurally connected with the shaft furnace are known from U.S. Pat. No. 4 248 626 and U.S. Pat. No. 4 270 740. In the melting unit, reduction gas is generated by coal gasification. The reduction gas is withdrawn from the melting unit and cooled before it is charged into the shaft furnace in order to prevent the material reduced in the shaft furnace from agglomerating. In order to prevent the very hot reduction gas from being carried over from the melting unit directly into the shaft furnace, a gas seal is provided in the direct connection between the melting unit and the shaft furnace.

The applicant knows that gas seals operated with nitrogen, which seal shaft furnaces against the environment, are customary. These gas seals have the disadvantage that the generation of nitrogen involves high technical expenditure, which results in high costs because large amounts of nitrogen are consumed.

The technical problem of the present invention is to eliminate this disadvantage and to provide a process of the type described above where a gas seal is operated with a less expensive sealing gas.

According to the invention, at a process for the reduction of metal-oxide-bearing material, particularly of iron ore, in a reduction vessel, wherein the metal-oxide-bearing material is charged from a vessel for the metal-oxide-bearing material into the reduction vessel and reduced in the latter by means of a reduction gas flowing countercurrently to the metal-oxide-bearing material and wherein waste reduction gas discharged from the reduction vessel is used for preheating the metal-oxide-bearing material in the vessel for the metal-oxide-bearing material, the technical problem is solved by combusting the waste reduction gas discharged from the reduction vessel and by operating a gas seal located between the reduction vessel and the vessel for metal-oxide-bearing material with the combusted waste reduction gas for, whereby the reduction vessel is sealed against the vessel for metal-oxide-bearing material.

The gas seal according to the invention, which is operated with combusted waste reduction gas, prevents any reduction gas that may still contain considerable portions of reducing constituents from being carried over from the reduction vessel into the vessel for metal-oxide-bearing material. In this gas seal, a sealing gas is used which is considerably less expensive than the usual sealing gases according to prior art, such as nitrogen.

The combusted waste reduction gas is expediently compressed before it is used as sealing gas. A preferred embodiment of the process according to the invention is characterized in that the combusted waste reduction gas is set or cooled to a temperature ranging between 100° C. and 700° C.

According to another preferred embodiment, an additional gas seal is operated with inert gas apart from the gas seal operated with combusted waste reduction gas, the additional gas seal being located between the gas seal operated with combusted waste reduction gas and the reduction vessel, wherein the gas seal operated with the combusted waste reduction gas assumes the function of the main gas seal and the gas seal operated with inert gas, for example, with nitrogen, assumes the function of an auxiliary gas seal, which furthermore prevents combusted waste reduction gas form entering the reduction vessel. In this way, a considerably smaller amount of inert gas is consumed than required for gas seals known from prior art.

According to a preferred embodiment of the process according to the invention, the reduction gas is at least partly generated from a weakly reducing gas, the reducing power of the weakly reducing gas being increased by treating it in order to eliminate oxidants, whereby a strongly reducing gas is formed.

The strongly reducing gas is preferably heated to a temperature ranging between 600° C. and 1000° C. and fed as reduction gas into the reduction vessel.

Another preferred embodiment is characterized in that the gas rich in oxidants which has been eliminated from the weakly reducing gas is combusted and, together with the combusted waste reduction gas, used for preheating the metal-oxide-bearing material in the vessel for metal-oxide-bearing material.

A plant for implementing the process, with a reduction vessel which is provided with an inlet for metal-oxide-bearing material, an inlet for reduction gas, an outlet for waste reduction gas and an outlet for reduced material and with a vessel for metal-oxide-bearing material which is connected with the reduction vessel by means of a line, a connecting line also being provided between the outlet for waste reduction gas and the vessel for metal-oxide-bearing material, is characterized in that a burner for combusting the waste reduction gas is provided in the connecting line between the outlet for waste reduction gas and the vessel for metal-oxide-bearing material and that a sealing leg, into which the line for waste reduction gas combusted in the burner leads, is provided in the connecting line between the reduction vessel and the vessel for metal-oxide-bearing material.

A compressor is expediently provided in the line for combusted waste reduction gas. Further according to a preferred embodiment of the plant according to the invention, an arrangement for setting the temperature of the combusted waste reduction gas within a range of 100–700° C. is provided in the line for combusted waste reduction gas.

According to another preferred embodiment, a supply line for an inert gas leads into the sealing leg, which supply line is located between the line for combusted waste reduction gas and the reduction vessel.

According to another preferred embodiment of the plant according to the invention, the inlet for reduction gas is connected with the arrangement for generating a strongly reducing gas from a weakly reducing gas through elimination of oxidants from the weakly reducing gas by means of a line. The arrangement for generating the strongly reducing gas preferably consists of a pressure-swing absorption plant.

Another preferred embodiment of the plant according to the invention is characterized in that a supply line for the gas rich in oxidants which has been eliminated from the weakly reducing gas leads from the arrangement for generating the strongly reducing gas to the burner.

Preferred embodiments of the invention are described in greater detail by means of the drawing. In the figures, the same reference symbols designate the same plant parts.

In FIG. 1, reference numeral 1 designates a conventional shaft furnace as reduction vessel for the reduction of iron ore which is conveyed from vessel 2, which represents an ore bin, through sealing leg 3 and downpipes 4 through inlet 5 into shaft furnace 1.

Reduction gas is fed into shaft furnace 1 at inlet 6 and flows upwards in counterflow to the iron ore within shaft furnace 1. On the top, it exits shaft furnace 1 at outlet 7 in the form of waste reduction gas (top gas) at a temperature of approx. 200–300° C., depending on the reduction gas. The iron ore reduced in shaft furnace 1 is discharged from shaft furnace 1 at outlet 8.

The waste reduction gas exiting shaft furnace 1 at outlet 7 is at least partly conveyed into burner 10 through line 9, in which combustible constituents of the off-gas, such as $CO$, $H_2$ and $CH_4$, are combusted. Part of the waste reduction gas is discharged through line 9a, if required. Reference numeral 11 designates the supply of an oxygenous combustion gas, for example, air, into burner 10. Subsequently, the combusted waste reduction gas, which has a temperature of approx. 1800° C., is set or cooled to a temperature ranging between 100° C. and 700° C. in arrangement 12, which can be, for example, a heat exchanger, reformer or scrubber.

After passing through arrangement 12, part of the combusted waste reduction gas is discharged through line 13, and the remaining part is compressed by means of compressor 14 and conveyed as sealing gas through line 15 into sealing leg 3, which is located between vessel 2 for metal-oxide-bearing material and shaft furnace 1.

Gas seal 16 is operated by means of the combusted waste reduction gas in sealing leg 3, shaft furnace 1 being sealed against vessel 2 for metal-oxide-bearing material so that any reduction gas which still contains considerable portions of $CO$, $H_2$ and $CH_4$ from entering vessel 2 for metal-oxide-bearing material. The sealing gas used according to the invention, i.e. combusted waste reduction gas, is less expensive than conventionally used sealing gases, such as nitrogen.

The combusted waste reduction gas, which has been cooled to a temperature ranging between 100° C. and 700° C., is then conveyed into vessel 2 in order to preheat the metal-oxide-bearing material contained therein.

As a result of preheating, the metal-oxide-bearing material has a higher temperature when it enters shaft furnace 1 so that the reduction gas in shaft furnace 1 can be utilized up to higher oxidation degrees. In other words, the capacity of shaft furnace 1 can be better utilized. This measure serves to increase the production capacity of shaft furnace 1 owing to a shorter dwell time of metal-oxide-bearing material in shaft furnace 1. Apart from that, rapid heating to reduction temperature has proved to be advantageous with regard to reduction. Moreover, heating without reductants does not lead to any change in the surface of the solid.

Figure 2:
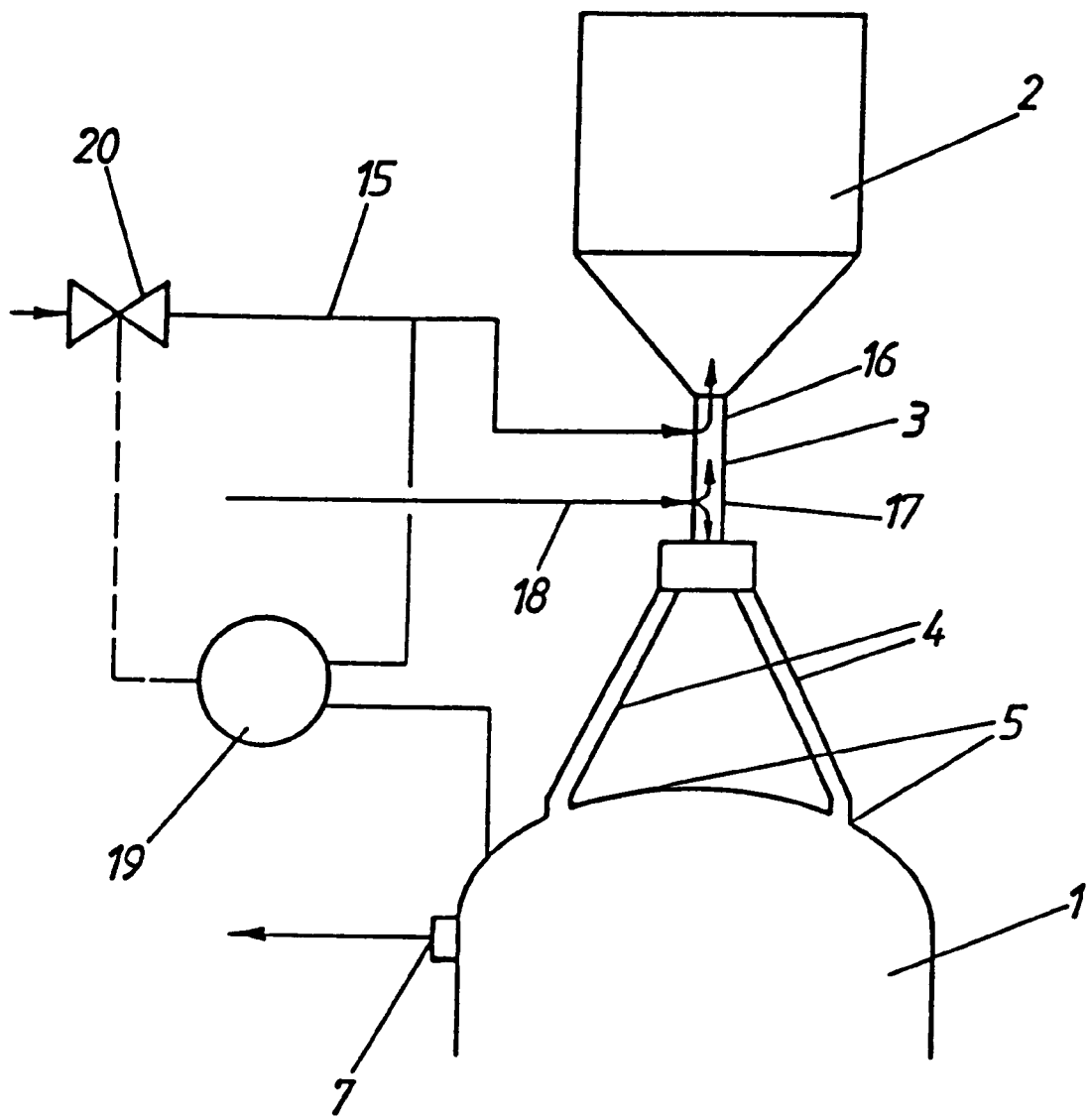

The function of gas seal 16 is explained in greater detail by means of FIG. 2. FIG. 2 shows part of FIG. 1 on an enlarged scale, the same reference symbols standing for the same plant parts.

The combusted waste reduction gas used as sealing gas is pressed into sealing leg 3 through line 15. The sealing gas flows upwards in sealing leg 3 and thus seals shaft furnace 1 against vessel 2 for metal-oxide-bearing material.

According to a preferred embodiment of the invention, additional gas seal 17 is operated with inert gas, such as nitrogen, on the shaft furnace side apart from gas seal 16, which is operated with combusted waste reduction gas, in order to reliably prevent the combusted waste reduction gas from entering shaft furnace 1. Nitrogen is pressed into sealing leg 3 through line 18. In this case, the combusted waste reduction gas can be simply cooled by admixing air. The oxygen content is increased in this way, but this does not cause any problems because gas seal 17 prevents ingress into shaft furnace 1.

The arrows in FIG. 2 indicate the direction of flow of the combusted waste reduction gas and of nitrogen. The combusted waste reduction gas assumes the function of the main sealing gas. The nitrogen assumes the function of auxiliary sealing gas and prevents the main sealing gas from entering shaft furnace 1.

In order to seal shaft furnace 1 against vessel 2 for metal-oxide-bearing material, the pressure in line 15 is adjusted to the pressure prevailing in shaft furnace 1 upstream of the junction with sealing leg 3 by means of arrangement 19 for differential pressure measurement in a way known to the specialist.

It is obvious that the gas pressure in line 15, after passing through valve 20, must be higher than the pressure of the reduction gas contained in shaft furnace 1. Valve 20 is controlled by arrangement 19 for differential pressure measurement.

Additionally, the pressure in supply line 18 for nitrogen is set to a value ensuring that a local nitrogen gas cushion builds up in sealing leg 3 which effectively prevents combusted waste reduction gas from entering shaft furnace 1.

Figure 3:
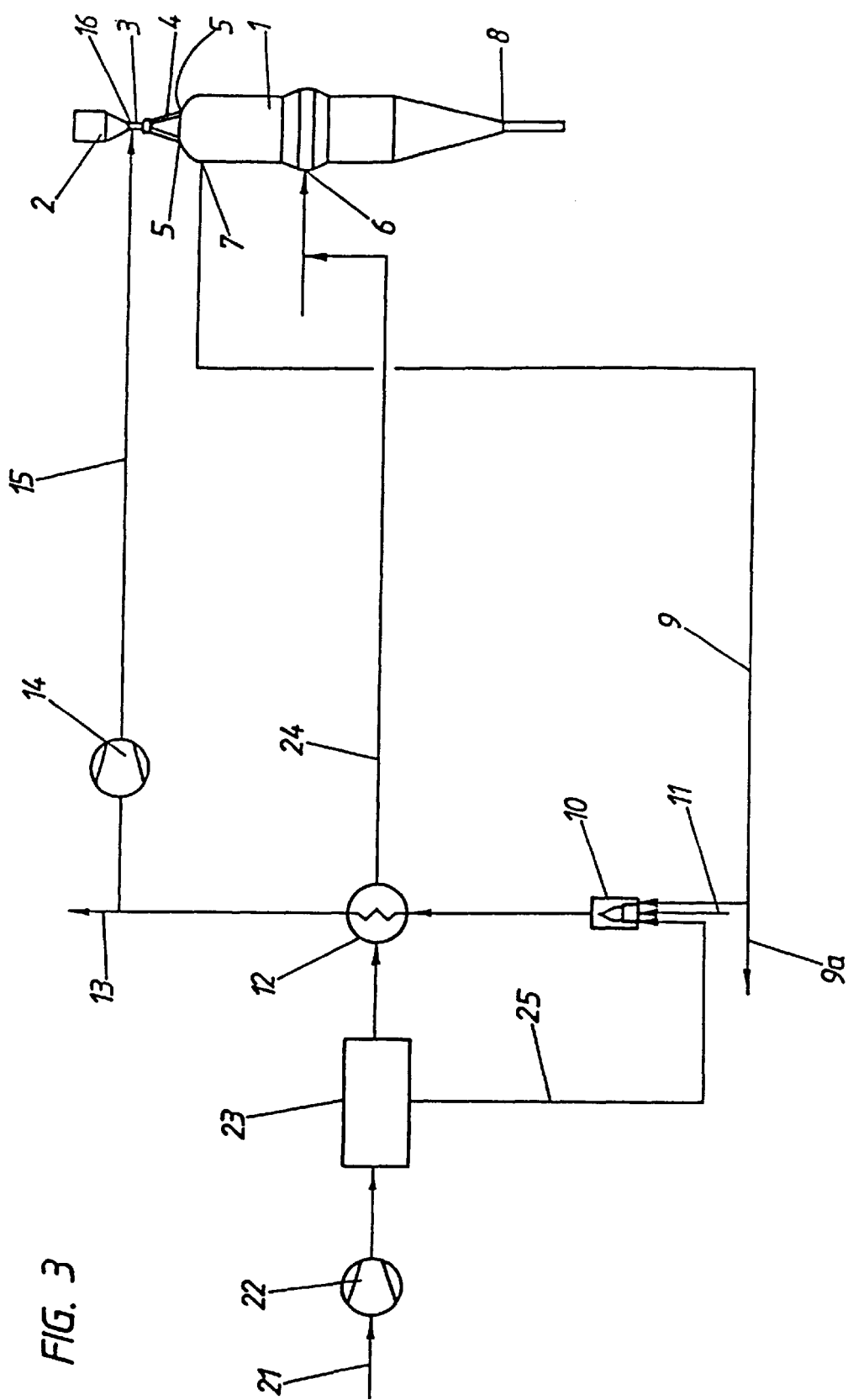

Another preferred embodiment of the process according to the invention is described by means of FIG. 3.

According to this embodiment, the reduction gas is at least partly generated from a weakly reducing gas, i.e. a gas with high contents of $CO_2$ and $H_2O$ and low contents of CO and $H_2$. The weakly reducing gas is supplied through supply line 21 and compressor 22 to arrangement 23 wherein $CO_2$ and $H_2O$ are largely eliminated and a strongly reducing gas, i.e. a gas with high contents of CO and $H_2$ and low contents of $CO_2$ and $H_2O$, is generated. Arrangement 23 may be designed, for example, as pressure-swing absorption plant.

Line 24 for the strongly reducing gas generated in arrangement 23 leads from arrangement 23 to inlet 6 for reduction gas. Heat exchanger 12 is provided for heating the strongly reducing gas to a temperature of approx. 600–1000° C.

Furthermore, line 25 for gas rich in oxidants which has been eliminated from the weakly reducing gas in arrangement 23 leads from arrangement 23 to burner 10, wherein the gas rich in oxidants is combusted. The combusted gas rich in oxidants, together with the combusted waste reduction gas, is used in vessel 2 for preheating the metal-oxide-bearing material.

What is claimed is:

1. A process for the reduction of metal-oxide-bearing material, comprising the steps of:

conveying the metal-oxide-bearing material from a vessel into a reduction vessel;

reducing the metal-oxide-bearing material in the reduction vessel by application of a reduction gas;

discharging a waste reduction gas from the reduction vessel;

combusting said waste reduction gas to form a combusted waste reduction gas;

forming a first gas seal between said vessel and said reduction vessel with said combusted waste reduction gas; and preheating the metal-oxide-bearing material in said vessel with said combusted waste reduction gas used to form said gas seal.

2. A process for the reduction of metal-oxide-bearing material as claimed in claim 1, further including the step of:

compressing said combusted waste reduction gas.

3. A process for the reduction of metal-oxide-bearing material as claimed in claim 1, further including the step of:

setting said combusted waste reduction gas to a temperature of about 100° C. to about 700° C.

4. A process for the reduction of metal-oxide-bearing material as claimed in claim 1, further including the step of:

forming a second gas seal between said first seal and said reduction vessel.

5. A process for the reduction of metal-oxide-bearing material as claimed in claim 4, wherein said second gas seal is formed with inert gas.

6. A process for the reduction of metal-oxide-bearing material as claimed in claim 1, wherein said reducing gas is at least partly generated from a weakly reducing gas by treating said weakly reducing gas to form a strongly reducing gas.

7. A process for the reduction of metal-oxide-bearing material as claimed in claim 6, further comprising the step of:

heating said strongly reducing gas to a temperature of about 600° C. to about 1000° C.

8. A process for the reduction of metal-oxide-bearing material as claimed in claim 6, wherein said weakly reducing gas contains oxidants and said strongly reducing gas is formed by removing said oxidants from said weakly reducing gas, and wherein said oxidants removed from said weakly reducing gas form an oxidant rich gas.

9. A process for the reduction of metal-oxide-bearing material as claimed in claim 8, further including the step of:

combusting said oxidant rich gas to form a combusted oxidant rich gas;

combining said combusted oxidant rich gas with said combusted waste reduction gas to form a combined combusted gas; and preheating the metal-oxide-bearing material in said vessel with said combined combusted gas.

* * * * *